US009553911B1

(12) United States Patent
Oz

(10) Patent No.: US 9,553,911 B1
(45) Date of Patent: Jan. 24, 2017

(54) SYSTEM, METHOD AND COMPUTER READABLE MEDIUM FOR MANAGING PROGRAM SWITCH REQUESTS

(75) Inventor: Ran Oz, Modiin (IL)

(73) Assignee: ARRIS Enterprises, Inc., Suwanee, GA (US)

( * ) Notice: Subject to any disclaimer, the term of this patent is extended or adjusted under 35 U.S.C. 154(b) by 1324 days.

(21) Appl. No.: 12/098,459

(22) Filed: Apr. 7, 2008

Related U.S. Application Data

(60) Provisional application No. 60/969,702, filed on Sep. 4, 2007.

(51) Int. Cl.
*G06F 15/16* (2006.01)
*H04L 29/06* (2006.01)
*H04N 21/61* (2011.01)

(52) U.S. Cl.
CPC ......... *H04L 65/607* (2013.01); *H04N 21/6118* (2013.01)

(58) Field of Classification Search
USPC ........................................................ 709/231
See application file for complete search history.

(56) References Cited

U.S. PATENT DOCUMENTS

| | | | | |
|---|---|---|---|---|
| 4,569,041 A * | 2/1986 | Takeuchi | ............... | H04L 12/64 370/352 |
| 5,404,352 A * | 4/1995 | Pauwels et al. | ............... | 370/390 |
| 5,621,728 A * | 4/1997 | Lightfoot | ............... | H04L 12/66 348/E7.06 |
| 6,356,567 B2 * | 3/2002 | Anderson et al. | ............ | 370/516 |
| 7,089,579 B1 * | 8/2006 | Mao | .................... | H04N 7/17318 348/E7.071 |
| 7,099,317 B2 | 8/2006 | Ambe et al. | | |
| 7,197,088 B1 * | 3/2007 | Yukawa | ........................ | 375/316 |
| 7,203,953 B2 * | 4/2007 | Mao et al. | ..................... | 725/109 |
| 7,366,961 B1 * | 4/2008 | Kovacevic et al. | .......... | 714/701 |
| 7,668,914 B2 * | 2/2010 | Parker et al. | ................. | 709/205 |
| 2002/0041756 A1 * | 4/2002 | Kato | ............................... | 386/69 |
| 2002/0088007 A1 * | 7/2002 | Shimoji et al. | ............... | 725/135 |
| 2003/0035486 A1 * | 2/2003 | Kato et al. | ............... | 375/240.26 |
| 2003/0217362 A1 * | 11/2003 | Summers et al. | .............. | 725/63 |
| 2004/0004560 A1 * | 1/2004 | Okamoto et al. | ............... | 341/50 |
| 2004/0249967 A1 * | 12/2004 | Swanson | ....................... | 709/231 |
| 2005/0105537 A1 * | 5/2005 | Motomura | .............. | 370/395.64 |
| 2007/0107026 A1 | 5/2007 | Sherer et al. | | |
| 2007/0171942 A1 | 7/2007 | Quinard | | |

(Continued)

FOREIGN PATENT DOCUMENTS

WO WO 2006/096104 A1 9/2006
WO WO 2007/087356 A2 8/2007

(Continued)

*Primary Examiner* — Richard G Keehn
(74) *Attorney, Agent, or Firm* — Stewart M. Wiener

(57) ABSTRACT

A method, system and computer readable medium for managing program switch requests, the method includes: (i) receiving a request from a first user device to switch from a current program to a next program; wherein the first user device filters the current program by using a first user device set of packet identifiers; (ii) associating the first user device set of packet identifiers with multiple streams of the next program; and (iii) transmitting to the user device the multiple streams of the next program; wherein these multiple streams are associated with the first user device set of packet identifiers.

28 Claims, 3 Drawing Sheets

(56) References Cited

U.S. PATENT DOCUMENTS

2007/0266398 A1    11/2007  Vandaele
2008/0022321 A1*   1/2008   Ver Steeg et al. .............. 725/78
2008/0278634 A1*   11/2008  Huang et al. ................. 348/734
2008/0313669 A1*   12/2008  Acharya et al. ............... 725/34

FOREIGN PATENT DOCUMENTS

WO    WO 2007/128436 A3    11/2007
WO    WO 2007/149029 A1    12/2007

* cited by examiner

US 9,553,911 B1

SYSTEM, METHOD AND COMPUTER READABLE MEDIUM FOR MANAGING PROGRAM SWITCH REQUESTS

RELATED APPLICATION

This application claims the priority of U.S. provisional patent application Ser. No. 60/969,702, filing date Sep. 4, 2007.

FIELD OF THE INVENTION

The invention relates to methods, systems, and computer readable medium for managing program switch requests.

BACKGROUND OF THE INVENTION

MPEG Compliant Streams

Methods and systems for compressing and transmitting media signals are known in the art. Compressed digital video is largely becoming the preferred medium to transmit to video viewers everywhere. Part of the Moving Pictures Experts Group (MPEG) specifications are standardized methods for compressing and transmitting video. Various audio compression techniques are also known in the art. In general, MPEG is used today for transmitting video over terrestrial, wireless, satellite and cable communication channels and also for storing digital video.

An audio stream is organized as an ordered sequence of frames. A video stream is usually organized as an ordered sequence of pictures. Each picture includes a plurality of slices, each slice including a plurality of macro blocks. The audio and video streams are provided to an audio encoder and video encoder respectively to generate compressed audio and video elementary streams, also referred to as elementary streams.

Elementary streams are packetized to produce PES packets. PES packets made up of elementary streams that form a program share a common time base. The PES packets may also include additional information. PES packets of distinct elementary streams can be arranged as a Transport Stream.

A Transport Stream combines one or more programs with one or more independent time bases into a single stream. Transport Streams include Transport packets of 188 bytes. Transport Stream packets start with a Transport packet header. The header includes a packet identifier (PID). Transport Stream packets of one PID value carry data of a single elementary stream. The packet identifiers are used by user devices to filter selected streams (relating, for example, to a certain television channel to which the user wishes to be tuned to) out of the Transport Stream.

A Transport Stream includes Program Specific Information (PSI) tables. The PSI tables specify which PIDs and accordingly which elementary streams are associated to form each program.

The PSI tables include a Program Association Table (PAT) and a Program Map Table (PMT) as well as other tables. Each table may be encapsulated in multiple Transport Stream packets. Packets that convey the PAT have a zero valued PID. PAT lists PID values for all PMT. The PAT lists two sets of values—one is a programs number (PN) and the other is the PID value of the Program Map Table associated with that program number. Program Number values are associated with television channels. A certain television channel broadcasts a certain program at a certain point in time. This program includes multiple elementary streams that are multiplexed together and broadcast to multiple user devices.

A program map table lists PID values of all the streams (audio, video, data, etc.) that form a program. A program map table may also include additional metadata pertaining to these streams.

If a user requests to be tuned to a certain television channel (such as but not limited to HBO, CNN, National Geographic, ABC, NBC, Channel four, and the like) a user device (such as a set top box) performs the following operations: (i) retrieve the PAT (filtering zero value PID packets), (ii) find (using the program number associated with the certain television channel) the PID value of the program map table associated with the television channel, (iii) filters the packets that convey the various elementary streams of a program that is being broadcast by the selected television channel based upon their PID values (as listed in the program map table). It is noted that the filtering process is also known as extraction.

In many cases, the user also has to be tuned to a different frequency, as only few programs are transmitted on a single carrier wave.

These mentioned above processes are time consuming and slow down the switching from one program to another. This is noticeable also in switched unicast systems that transmit a unique (unicast) program per user.

SUMMARY OF THE INVENTION

A method for managing program switch requests, the method includes: receiving a request from a first user device to switch from a current program to a next program; wherein the first user device filters the current program by using a first user device set of packet identifiers; associating the first user device set of packet identifiers with multiple streams of the next program; and transmitting to the user device the multiple streams of the next program; wherein these multiple streams are associated with the first user device set of packet identifiers.

A computer readable medium having computer-readable code embodied therein for sharing media content, the computer-readable code comprising instructions for: receiving a request from a first user device to switch from a current program to a next program; wherein a first user device filters the current program by using a first user device set of packet identifiers; associating the first user device set of packet identifiers with multiple streams of the next program; and transmitting to the user device the multiple streams of the next program; wherein these multiple streams are associated with the first user device set of packet identifiers.

A system for managing program switch requests, the system includes: an interface for receiving a request from a first user device to switch from a current program to a next program; wherein the first user device filters the current program by using a first user device set of packet identifiers; and a controller, that is adapted to: associate the first user device set of packet identifiers with multiple streams of the next program; and initiate a transmission to the user device the multiple streams of the next program; wherein the multiple streams are associated with the first user device set of packet identifiers.

BRIEF DESCRIPTION OF THE DRAWINGS

The abovementioned and other objects, features, and advantages of the present invention will become more apparent from the following detailed description, when applied in conjunction with the accompanying drawings. In the drawings, similar reference characters denote similar elements throughout the different views, in which.

DETAILED DESCRIPTION OF THE DRAWINGS

For simplicity of explanation, the following pages will describe an MPEG-2 compliant system and method. It is noted that the scope of the invention is not necessarily limited to MPEG compliant Transport Streams.

The term "television channel" can be interpreted in the normal conventional sense, and can also mean a television station or its cable/satellite counterpart. A television channel is equivalent to a program.

Conveniently, a user device is associated with a user device set of packet identifiers. Thus, a user device filters media streams by using the same packet identifiers, regardless of program switches. Conveniently, each user device has its own program map table (PMT) and the content of that table does not change. Accordingly, a program switch from a current program to a next program involves remapping the packet identifiers of the streams (video, audio, and data) of the next program to match a set of user device packet identifiers.

The allocation (or association) of user device sets of packet identifiers can be done during an initialization stage, and can be updated in view of user device disconnections, user devices that start receiving content and the like.

A user device set of packet identifiers can include one program identifier per stream of a program. Typically there is at least one program identifier for at least one video stream, at least one other program identifier for at least one audio stream and in some cases even at least one program identifier for a data stream. It is noted that a user device set of packet identifiers can include one or more packet identifiers.

A user device can receive user device filtering information indicative of the user device set of packet identifiers and set its filters accordingly. After these filters are set, program changes will not require the user device to search for another PMT or PAT. The user device can also receive user device tuning information that is representative of the frequency of programs that are sent to the user device.

Conveniently, the frequency of the programs is also set per user device. Typically, a sub group of programs are transmitted over a single carrier and multiple carriers are being used for conveying a whole group of programs. In order to prevent the user device from re-tuning as a result of a program switch, the frequencies of the programs that are sent to a certain user device remain unchanged despite program switches.

Figure 1:
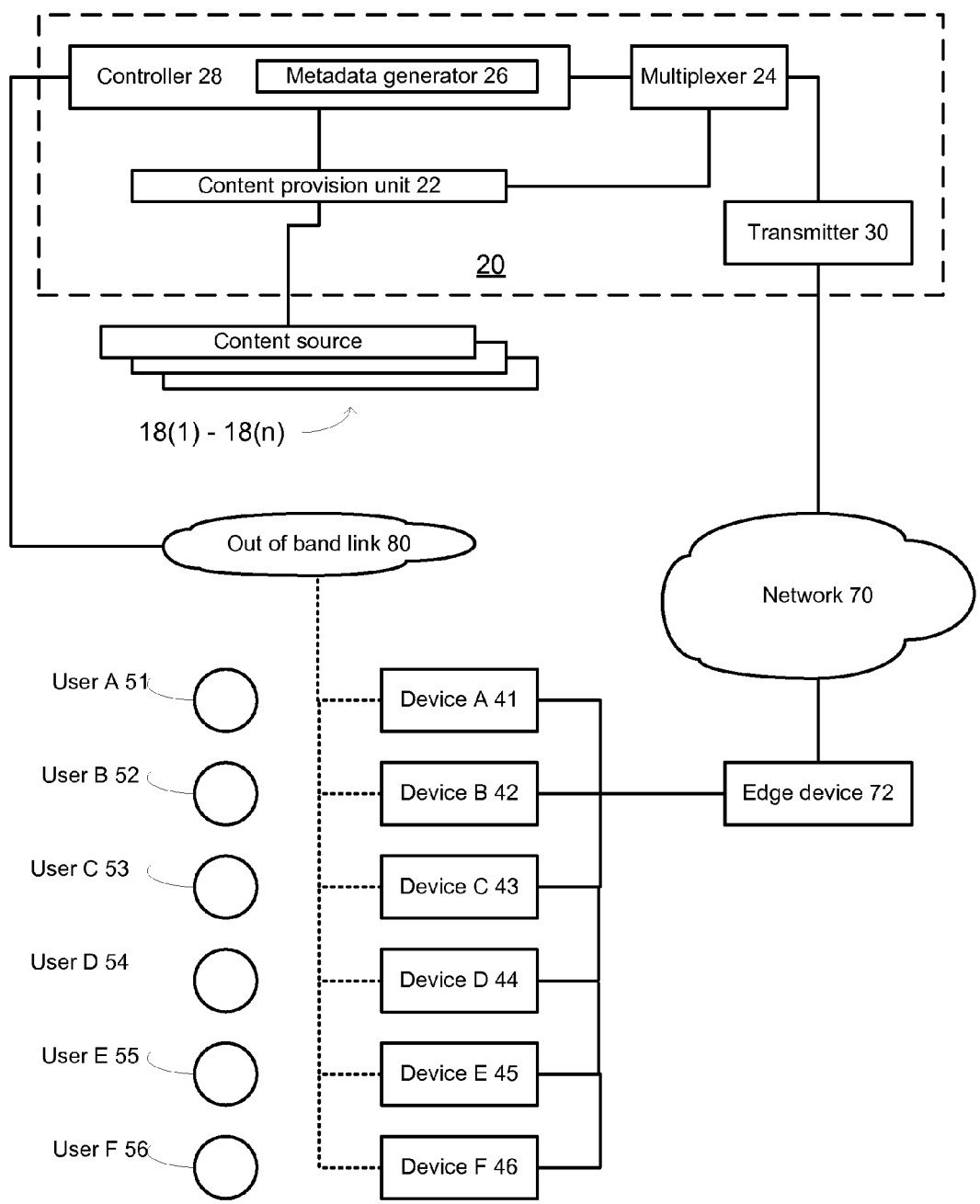
FIG. 1 illustrates a system and its environment, according to an embodiment of the invention.

FIG. 1 illustrates system 20 and its environment according to an embodiment of the invention.

System 20 is connected, via network 70 and out of band link 80 to user devices A-F 41-46 of users A-F 51-56. A user device is a device that is able to receive a multiplex of programs from network 70 and filter a selected program that represents content that it should receive. The multiplex of programs includes one or more unicast programs and can also include multicast or broadcast programs. A typical user device is a set top box, but other user devices can be used to filter programs.

System 20 includes controller 28, multiplexer 24, transmitter 30 and content provision unit 22. Controller 28 includes metadata generator 26 and is connected to various components of system 20, such as but not limited to multiplexer 24 and content provision unit 22.

Controller 28 can coordinate the operation of these components and determine which programs to send to multiplexer 24, which metadata should be generated, how to process content streams and perform other or alternative tasks.

It is assumed that each user device out of devices A-F 41-46 is associated with its own unique user device set of packet identifiers. For example, the g'th user device (wherein index g ranges between A and F) is configured to: (i) filter a video stream that is identified by a predefined program identifier (PID) value of PID_g_V; (ii) filter an audio stream that is identified by a PID value of PID_g_A; and (iii) filter a data stream that is identified by a PID value of PID_g_D. The PID values of different streams differ from each other.

It is noted that system 20 can receive multiple streams that have PID that differ from the mentioned above PID values. Accordingly, system 20 performs PID re-stamping.

It is noted that if multiple users request to review the same program, each user receives a version of the program, whereas the version differs by the packet identifiers of the streams that form these versions.

Metadata generator 26 can generate metadata such as user device tuning information, and additionally or alternatively, user device filtering information. The user device filtering information can include various PSI tables, whereas a PMT table (that remains unchanged despite program switches) is allocated per user device.

User device filtering information can include PSI table, but this is not necessarily so. For example, both PSI tables and user device filtering information can be set to a user device.

Controller 28 also controls the frequency of programs that are being transmitted by transmitter 30 so as to maintain the frequency of programs that are transmitted to a certain user device despite a program switch.

Conveniently, the metadata (user device tuning information and additionally or alternatively user device filtering information) is sent out of band, but this is not necessarily so. Multiple PSI tables are multiplexed in the multiplex of programs and are received concurrently by different user devices. The user device filtering information assists different user devices to filter different program map tables.

PSI tables can be sent to multiplexer 24 and are multiplexed with content provided to multiplexer 24 by content provision unit 22.

Content provision unit 22 can receive content from multiple content sources 18(1)-18(n). The content can include video content, audio content, data content, and the like. The content can either be provided to content provision unit 22 in an elementary stream format (such as but not limited to MPEG compliant elementary stream format) or can be processed, at least partially by content provision unit 22, to be output in an elementary stream format.

Multiplexer 24 multiplexes metadata and elementary streams to provide a multiplexed signal that is also referred to as a multiplex of programs. The multiplex of programs is sent to transmitter 30 and then transmitted, via network 70, to user devices A-F 42-64. An intermediate device (such as edge device 72) can be connected between user devices 41-46 and network 70. Edge device 72 can perform at least one of the following operations: multiplexing, re-multiplexing, content insertion, content deletion, video processing, metadata update, and the like.

System 20 can perform additional tasks such as media compression, media encoding, media encryption, modulation, PID re-mapping and the like. The various components of system 20 (multiplexer 24, transmitter 30, content provision unit 22 and metadata generator 26) can include hardware, software and/or firmware modules, can be proximate to each other, distant from each other, partially integrated with each other and the like.

System 20 can alter the content of the multiplex of programs, in response to various parameters such as but not limited to requests from users to be tuned to certain television channels (or to receive other content), user profiles (socio-economic profile, viewing patterns), network limitations and capabilities, user device limitations and capabilities, profiles of the different users and the like.

PID remapping and program number (PN) remapping are required to maintain the same PID values per user device, regardless program switches, can be implemented by system 20 (and especially by multiplexer 24) or by intermediate units (not shown) that are located between system 20 and user devices A-F 41-46.

Figure 2:
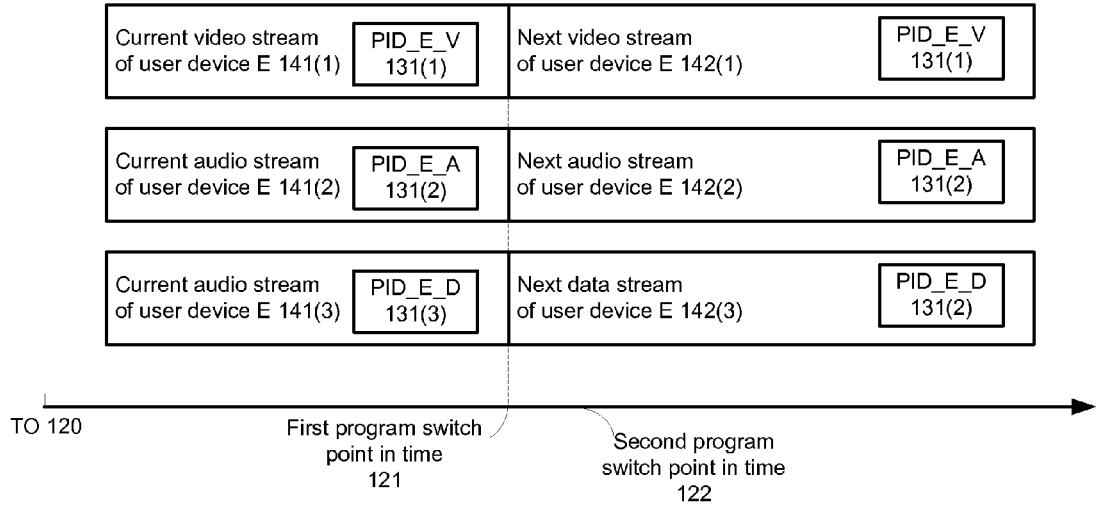
FIG. 2 illustrates multiple streams and program map tables that are sent to two users, according to an embodiment of the invention.
Figure 2:
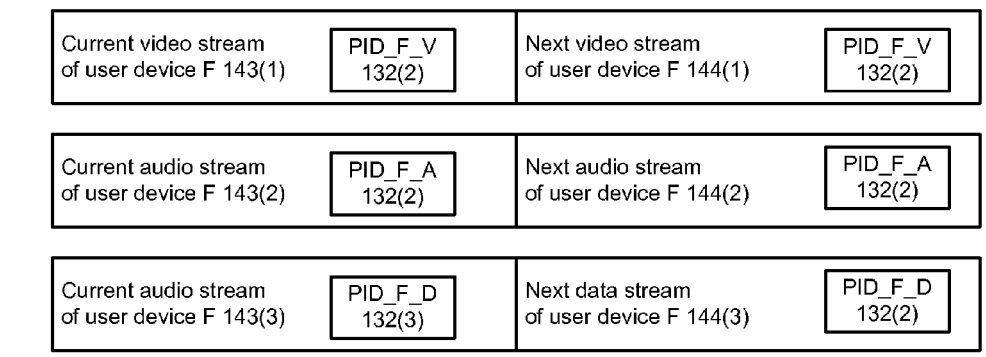
Figure 2:
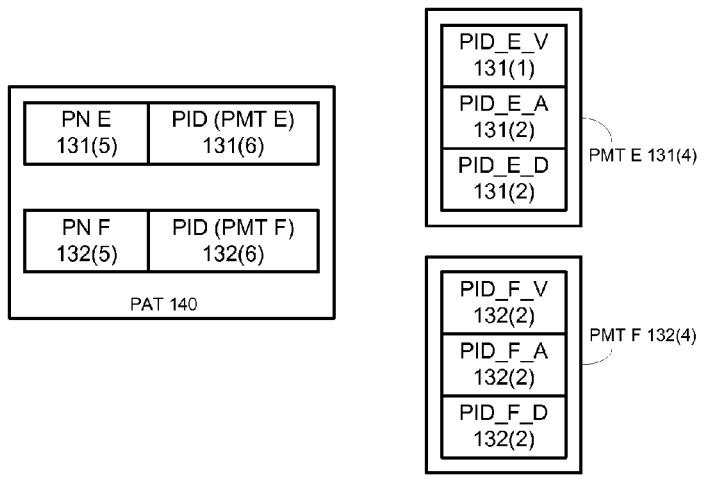

FIG. 2 illustrates few content streams 141(1), 141(2), 141(3), 142(1), 142(2), 142(3), 143(1), 143(2), 143(3), 144(1), 144(2) and 143(3), PMTs 131(4) and 132(4) and PAT 140 that are sent to user devices E and F 45 and 46, according to an embodiment of the invention.

At point in time T0 120 system 20 associates user device E set of packet identifiers with user device E 45 and associates a user device F set of packet identifiers with user device F 46.

User device E set of packet identifiers include: user device E video stream program identifier PID_E_V 131(1), user device E video audio program identifier PID_E_A 131(2) and user device E data stream program identifier PID_E_D 131(3). These content stream packet identifiers can be included in a user device E PMT-PMT E 131(4). PAT 140 includes an association between a program number of user device E (denoted PN E 131(5)) and the PID of PMT E-PID(PMT E) 131(6).

User device F set of packet identifiers include: user device F video stream program identifier PID_F_V 132(1), user device F video audio program identifier PID_F_A 132(2) and user device F data stream program identifier PID_F_D 132(3). These content stream packet identifiers can be included in a user device F PMT-PMT F 132(4). PAT 140 includes an association between a program number of user device F (denoted PN F 132(5)) and the PID of PMT F-PID(PMT F) 132(6).

Conveniently, user device E 45 and user device F 46 receive user device tuning information that represents the frequencies of the programs to be received by these user devices.

At first switch point in time 121 user E 45 requests to perform a program switch from a program that is currently viewed by user E (referred to as current program) to another program (referred to as next program). The metadata that is sent to user device E 45 does not change. System 20 alters the packet identifiers of the stream of the next program to be equal to packet identifiers 131(1), 131(2), and 131(3).

After T0 120 and until first program switch point in time 121 user device E receives: current video stream of user device E 141(1), current audio stream of user device E 141(2) and current video stream of user device E 141(3). Current video stream of user device E 141(1) is identified by PID_E_V 131(1), current audio stream of user device E 141(2) is identified by PID_E_A 131(2) and current data stream of user device E 141(3) is identified by PID_E_D 131(3)

After first program switch point in time 121 user device E receives next video stream of user device E 142(1), next audio stream of user device E 142(2) and next video stream of user device E 142(3). Next video stream of user device E 142(1) is identified by PID_E_V 131(1), next audio stream of user device E 142(2) is identified by PID_E_A 131(2) and next data stream of user device E 142(3) is identified by PID_E_D 131(3).

At second switch point in time 122 user F 46 requests to perform a program switch from a program that is currently viewed by user F (referred to as current program) to another program (referred to as next program). The content of the metadata that is sent to user device F 46 does not change. System 20 alters the packet identifiers of the stream of that next program to be equal to packet identifiers 132(1), 132(2), and 132(3).

After TO 120 and until second program switch point in time 122 user device F receives: current video stream of user device F 143(1), current audio stream of user device F 143(2) and current video stream of user device F 143(3). Current video stream of user device F 143(1) is identified by PID_F_V 132(1), current audio stream of user device F 143(2) is identified by PID_F_A 132(2) and current data stream of user device F 143(3) is identified by PID_F_D 132(3).

After second program switch point in time 122 user device F receives: next video stream of user device F 144(1), next audio stream of user device F 144(2) and next video stream of user device F 144(3). Next video stream of user device F 144(1) is identified by PID_F_V 132(1), next audio stream of user device F 144(2) is identified by PID_F_A 132(2) and next data stream of user device F 144(3) is identified by PID_F_D 132(3).

Figure 3:
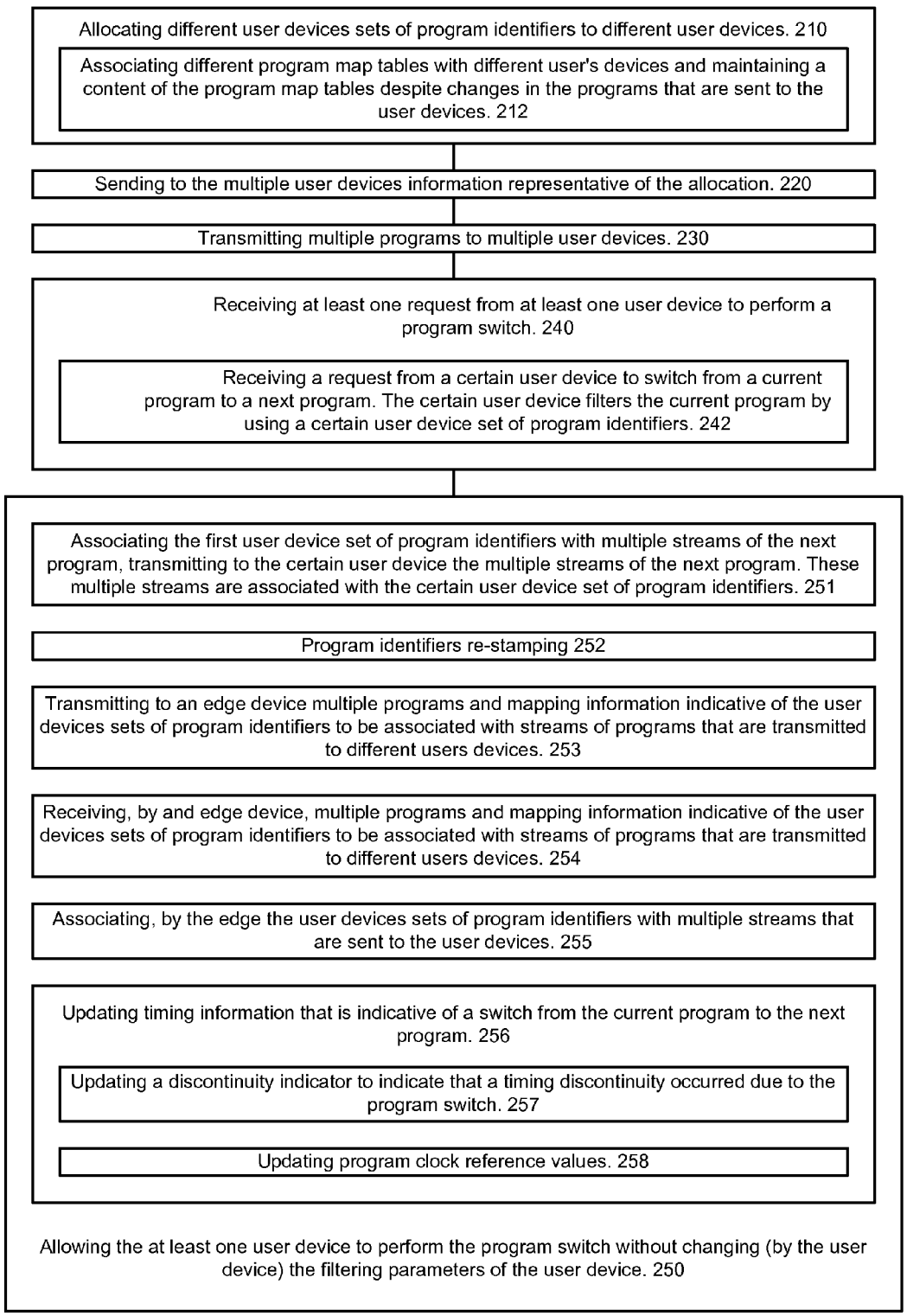
FIG. 3 is a flow chart of a method for managing program switch requests according to an embodiment of the invention.

FIG. 3 illustrates method 200 for managing program switch requests, according to an embodiment of the invention.

Method 200 starts by stage 210 of allocating different user devices sets of packet identifiers to different user devices. The allocation can be arbitrary, random, and pseudo-random, according to a predefined scheme or a combination thereof. It is noted that the allocation can be updated. For example, in response to the addition of new users, to changes in the relative allocation of unicast, multicast and broadcast transmissions and the like.

Stage 210 includes associating different program map tables with different user's devices and maintaining a content of the program map tables despite changes in the programs that are sent to the user devices.

Stage 210 is followed by stage 220 of sending to the multiple user devices information representative of the allocation. Stage 220 can include transmitting to user devices user device filtering information and can also include transmitting to user devices tuning information. Conveniently, it is assumed that the user devices, after receiving this information will be tuned accordingly.

Stage 220 is followed by stage 230 of transmitting multiple programs to multiple user devices. Conveniently, a multiplex of programs is sent to multiple user devices that form a service group.

The user devices are configured according to the user device tuning information and, additionally or alternatively, according to user device filtering information. A program that is transmitted to a certain user device is associated with user device set of packet identifiers.

Stage 230 is followed by stage 240 of receiving at least one request from at least one user device to perform a program switch. Stage 240 can include multiple instances of stage 242 of receiving a request from a certain user device to switch from a current program to a next program. The certain user device filters the current program by using a certain user device set of packet identifiers.

Stage 240 is followed by stage 250 of allowing the at least one user device to perform the program switch without changing (by the user device) the filtering parameters of the user device.

Stage 250 conveniently includes (indicated by box 251): (i) associating the first user device set of packet identifiers with multiple streams of the next program; and (ii) transmitting to the certain user device the multiple streams of the next program. These multiple streams are associated with the certain user device set of packet identifiers.

Stage 250 conveniently includes: (i) packet identifiers re-stamping (box 252), (ii) transmitting to an edge device multiple programs and mapping information indicative of the user devices sets of packet identifiers to be associated with streams of programs that are transmitted to different users devices (box 253); (iii) receiving, by an edge device, multiple programs and mapping information indicative of the user devices sets of packet identifiers to be associated with streams of programs that are transmitted to different users devices (box 254) (iv) associating, by the edge the user devices sets of packet identifiers with multiple streams that are sent to the user devices (box 255).

State 250 can also include updating (box 256) timing information that is indicative of a switch from the current program to the next program. It can include updating (box 257) a discontinuity indicator to indicate that a timing discontinuity occurred due to the program switch or updating (box 258) program clock reference values and other associated timing values such as presentation time stamps and decoding time stamps.

The invention can be executed by a computer-readable code that includes instructions to execute one or more stages of method 200. The computer-readable code can be stored in a computer readable medium such as but not limited to a disk, a tape, a diskette, a compact disk, a memory unit and the like.

Conveniently, a computer readable medium having computer-readable code embodied therein for sharing media content is provided. The computer-readable code including instructions for receiving a request from a first user device to switch from a current program to a next program; wherein a first user device filters the current program by using a first user device set of packet identifiers; associating the first user device set of packet identifiers with multiple streams of the next program; and transmitting to the user device the multiple streams of the next program; wherein these multiple streams are associated with the first user device set of packet identifiers.

Variations, modifications, and other implementations of what is described herein will occur to those of ordinary skill in the art without departing from the spirit and the scope of the invention as claimed. Accordingly, the invention is to be defined not by the preceding illustrative description but instead by the spirit and scope of the following claims.

I claim:

1. A method for managing program switch requests, the method comprising:

receiving a request from a first user device to switch from a current program to a next program; wherein the first user device receives a plurality of motion pictures expert group (MPEG) streams and extracts multiple program streams including the current program from the plurality of MPEG streams by using a first user device set of packet identifiers (PIDs) associated with the first user device, and wherein the PIDs are associated with an address for the first user device;

associating the first user device set of PIDs with multiple program streams comprising the next program requested by the first user device, the associating being performed by inserting the first user device set of PIDs into MPEG frames containing the next program; and transmitting to the first user device the multiple program streams of the next program; wherein these multiple streams include the first user device set of packet identifiers, and wherein the transmitting to the first user device multiple program streams of the next program comprises a channel change at a headend, wherein the channel change does not require a set top box comprising the first user device to tune to a new program stream.

2. The method according to claim 1 wherein the associating comprises program identifiers re-mapping of packet identifiers of the multiple streams of the next program to the first user device set of PIDs.

3. The method according to claim 1 wherein the transmitting comprises unicast transmitting the multiple streams of the next program to the first user device.

4. The method according to claim 1 comprising transmitting to an edge device multiple programs and mapping information indicative of a plurality of user devices' sets of PIDs to be associated with streams of programs that are transmitted to a plurality of different user devices.

5. The method according to claim 1 further comprising:
receiving, by an edge device, multiple programs and mapping information indicative of a plurality of user devices' sets of PIDs to be associated with streams of programs that are transmitted to different user devices of a plurality of user devices; and
associating, by the edge device, the user devices' sets of PIDs with multiple streams that are sent to the user devices.

6. The method according to claim 1 further comprising:
associating different program map tables with different user devices of a plurality of user devices; and
maintaining a content of the program map tables despite changes in the programs that are sent to the user devices.

7. The method according to claim 1 wherein the transmitting is preceded by updating timing information that is indicative of a switch from the current program to the next program.

8. The method according to claim 7 wherein the updating comprises updating a discontinuity indicator to indicate that a timing discontinuity occurred due to the program switch or updating program clock reference values.

9. The method according to claim 1 wherein headers of transport stream packets of each of the multiple streams comprise packet identifiers of the first user device set of PIDs.

10. The method according to claim 1, comprising sending out of band user device filtering information indicative of user device sets of PIDs.

11. The method according to claim 1, comprising allocating different user device sets of PIDs to a plurality of different user devices wherein the allocation is pseudorandom or random.

12. The method according to claim 1, comprising allocating different user device sets of PIDs in response to changes in a relative allocation of unicast, multicast and broadcast transmissions.

13. A non-transitory computer readable medium having computer-readable code embodied therein for sharing media content, the computer-readable code comprising stored instructions that, when executed by a processor, cause the processor to perform steps of:
receiving a request from a first user device to switch from a current program to a next program; wherein the first user device receives a plurality of motion pictures expert group (MPEG) streams and extracts multiple program streams including the current program from the plurality of MPEG streams by using a first user device set of packet identifiers (PIDs) associated with the first user device, and wherein the PIDs are associated with an address for the first user device;
associating the first user device set of PIDs with multiple program streams comprising the next program requested by the first user device, the associating being performed by inserting the first user device set of PIDs into MPEG frames containing the next program; and
transmitting to the user device the multiple program streams of the next program; wherein these multiple streams include the first user device set of PIDs, and wherein the transmitting to the user device multiple program streams of the next program comprises a channel change at a headend that does not require that a set top box comprising the first user device tune to a new program stream.

14. The non-transitory computer readable medium of claim 13, wherein the stored instructions further cause the processor to perform:
remapping of packet identifiers of the multiple streams of the next program to the first user device set of PIDs.

15. The non-transitory computer readable medium of claim 13, wherein the stored instructions further cause the processor to perform:
unicast transmitting the multiple streams of the next program to the user device.

16. The non-transitory computer readable medium of claim 13, wherein the stored instructions further cause the processor to perform:
transmitting to an edge device multiple programs and mapping information indicative of a plurality of user devices' sets of PIDs to be associated with streams of programs that are transmitted to a plurality of different users devices.

17. The non-transitory computer readable medium of claim 13, wherein the stored instructions further cause the processor to perform:
receiving, by an edge device, multiple programs and mapping information indicative of a plurality of user devices' sets of PIDs to be associated with streams of programs that are transmitted to different user devices of a plurality of user devices; and
associating, by the edge device, the user devices' sets of PIDs with multiple streams that are sent to the user devices.

18. The non-transitory computer readable medium of claim 13, wherein the stored instructions further cause the processor to perform:
associating different program map tables with different user devices of a plurality of user devices; and
maintaining a content of the program map tables despite changes in the programs that are sent to the user devices.

19. The non-transitory computer readable medium of claim 13, wherein the stored instructions further cause the processor to perform:
updating timing information that is indicative of a switch from the current program to the next program.

20. The non-transitory computer readable medium of claim 19, wherein the stored instructions further cause the processor to perform:
updating a discontinuity indicator to indicate that a timing discontinuity occurred due to the program switch or updating program clock reference values.

21. A system for managing program switch requests, the system comprising:
a headend;
an interface residing at the headend to receive a request from a first user device to switch from a current program to a next program;
wherein the first user device receives a plurality of motion pictures expert group (MPEG) streams and extracts multiple program streams including the current program from the plurality of MPEG streams by using a first user device set of packet identifiers (PIDs) associated with the first user device, and wherein the PIDs are associated with an address for the first user device; and
a controller to facilitate a channel change for the first user device without requiring the first user device switch to another program stream, the controller being adapted to:
associate the first user device set of PIDs with multiple program streams comprising the next program requested by the first user device, the associating being performed by inserting the first user device set of PIDs into MPEG frames containing the next program; and
initiate a transmission to the user device of the multiple program streams of the next program;
wherein the multiple streams include the first user device set of PIDs in the headers of the multiple program streams.

22. The system according to claim 21 wherein the controller is adapted to participate in packet identifiers remapping of packet identifiers of the multiple streams of the next program to the first user device set of PIDs.

23. The system according to claim 21 wherein the controller is adapted to initiate unicast transmitting of the multiple streams of the next program to the user device.

24. The system according to claim 21 wherein the controller is adapted to control a transmission to an edge device of multiple programs and mapping information indicative of a plurality of user devices' sets of PIDs to be associated with streams of programs that are transmitted to a plurality of different user devices.

25. The system according to claim 21 wherein the controller is adapted to receive multiple programs and mapping information indicative of a plurality of user devices' sets of PIDs to be associated with streams of programs that are transmitted to different user devices, and to associate the user devices' sets of PIDs with multiple streams that are sent to the user devices.

26. The system according to claim 21 wherein the controller is adapted to associate different program map tables with different users devices and maintain a content of the program map tables despite changes in the programs that are sent to the user devices.

27. The system according to claim 21 wherein the controller is adapted to update timing information that is indicative of a switch from the current program to the next program.

28. The system according to claim 21 wherein the controller is adapted to update a discontinuity indicator to indicate that a timing discontinuity occurred due to the program switch or to update program clock reference values.

* * * * *